June 4, 1957  J. D. REYNOLDS  2,794,576
AUTOMATIC STOCK FEEDER
Filed May 10, 1954  2 Sheets-Sheet 2

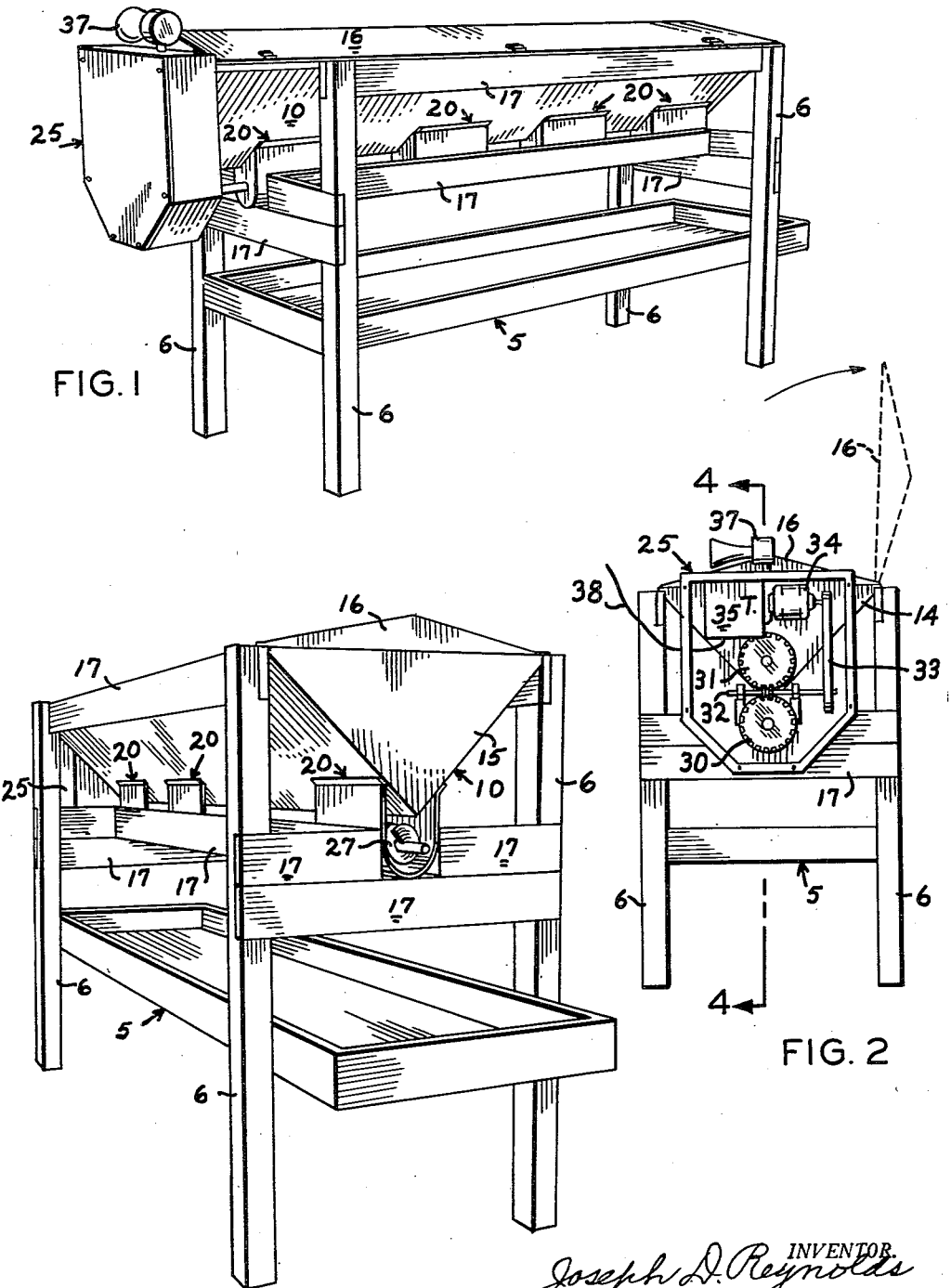

Joseph D. Reynolds
INVENTOR.

BY Loye J. Miller
ATTORNEY

United States Patent Office 2,794,576
Patented June 4, 1957

2,794,576

AUTOMATIC STOCK FEEDER

Joseph D. Reynolds, Gotebo, Okla.

Application May 10, 1954, Serial No. 428,714

2 Claims. (Cl. 222—185)

The present invention relates to feeding devices for livestock and more particularly to an automatic time controlled motor operated means for supplying feed from a storage hopper to a feeding trough, whereby a predetermined quantity of feed is supplied to the feeding trough at selected times.

It is common practice for ranchers to haul feed to pastures where livestock is kept, in a pick-up or truck, and place the feed in feeding troughs. By sounding the horn of the pick-up each time feed is placed within the feeding troughs, the livestock soon learn to come to the feeding place whenever they hear the horn sounded. Hauling feed out to the pastures or feeding lots and manually placing the desired amount of feed within the troughs each time it is desired to feed the livestock, is a time consuming task. Some ranch owners provide storage housing adjacent the feeding location in which to keep a supply of feed, but this does not eliminate the necessity of some individual periodically transferring feed from the store house to the feeding troughs.

Accordingly it is the primary object of this invention to provide a storage hopper arranged over a feeding trough for livestock which will automatically discharge a desired quantity of feed into the feeding trough at a selected time.

Another important object is to provide a device of this class which is comparatively simple in construction and efficient and reliable in operation.

The present invention accomplishes this and other objects by providing a horizontal storage hopper disposed at a suitable elevation above a conventional feed trough. The bottom of the hopper is provided with a series of outlets in communication with horizontal discharge housings open at one end for equally distributing the feed throughout the length of the feed trough. An auger feed screw is operatively installed within each discharge housing rotatably connected to an electric motor for discharging the feed from the hopper into the trough. A time controlled electric switch is connected between the motor and the source of power for starting and stopping the operation of the motor at predetermined times.

Other objects will be apparent from the following description when taken in conjunction with the accompanying two sheets of drawings, wherein:

Figure 1 is a perspective view of the device;

Figure 2 is an elevational end view of the device with the control box cover removed and showing, in dotted lines, the storage hopper lid in raised position;

Figure 3 is a perspective view similar to Fig. 1, but showing the device from the opposite end;

Like characters of reference designate like parts in those figures of the drawings in which they occur.

In the drawings:

Figure 4:
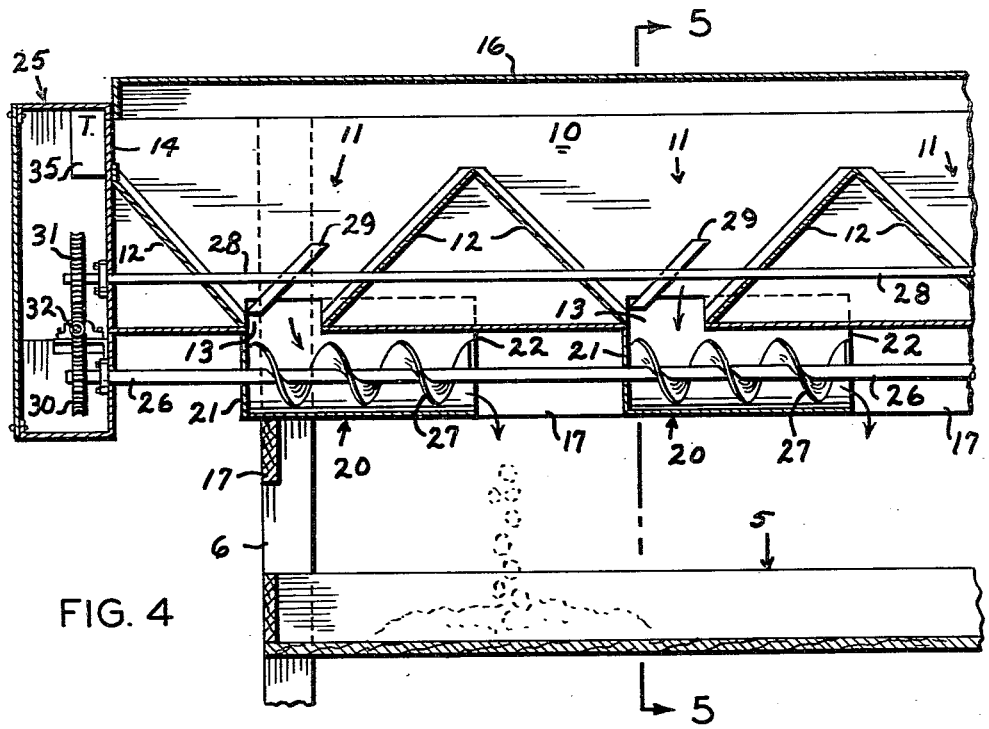
Figure 4 is a fragmentary vertical cross-sectional view of the device taken substantially along line 4—4 of Fig. 2; and, Figure 5 is a fragmentary vertical cross-sectional view of the device taken substantially along line 5—5 of Fig. 4.
Figure 5:
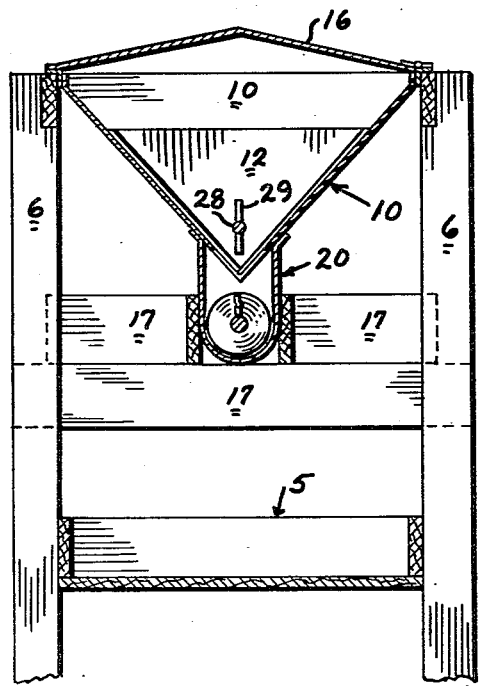

The reference numeral 5 indicates, as a whole, a rectangular comparatively shallow conventional feed trough, of a desired length, supported adjacent its four corners in spaced horizontal relation to the ground by four vertical supports 6. The upper ends of the supports 6 cross-sectionally support a V-shaped storage hopper 10 having closed ends 14 and 15 in horizontal spaced relation above the feed trough 5 so that the feed will fall into the trough when it is discharged from the hopper. The length of the supports 6 is great enough to provide sufficient head room space for livestock between the hopper 10 and the feed trough 5. The interior of the storage hopper 10 is longitudinally equally divided into a plurality of sections 11 by transverse downwardly inclined converging co-operating partitions 12 (Fig. 4) for emptying the hopper of all of the feed and in proper distribution throughout the length of the feed trough. A rectangular outlet or aperture 13, of a selected size, is cut in the bottom of each section 11. A suitable hinged lid 16 protects the hopper 10 and its contents.

A like plurality of elongated substantially U-shaped housings 20 are rigidly connected horizontally and longitudinally to the opposing sides of the lower portion of the V-shaped hopper 10 enveloping the aperture 13. The housings 20 are substantially longer than the apertures 13 and have one closed end 21 adjacent the adjoining edge of the aperture 13 and the opposite end 22 of the housings 20 is open for the purposes more fully explained hereinbelow. Suitable longitudinal and cross bracing 17 is provided for protecting the housings 20 from damage by the heads of the livestock.

A suitable control box 25 is rigidly mounted at one end of the hopper 10. A rotatably mounted shaft 26 extends from within the control box 25 axially through the several housings 20 and has rigidly secured thereon within each housing 20 an auger feed screw or conveyor 27 of substantially the same length as each housing 20, and having a diameter great enough to be closely received by the arcuate lower surface of the U-shaped housings 20.

Extending from within the control box 25 and through the hopper sections 11 and partitions 12 is a rotatably mounted second shaft 28 which is parallel with the shaft 26 and the bottom of the hopper 10, and has a plurality of rotary paddles or stirrers 29 secured thereto, one within each section 11. The purpose of these paddles is to agitate the feed and keep it from caking within the hopper sections 11 so that positive flow of feed through the apertures 13 to the discharge housings 20 is insured at all times.

A pair of gears 30 and 31 are axially connected to the ends of the shafts 26 and 28, respectively, which are within the control box 25 (Fig. 2). The gears 30 and 31 are in drivable contact with a worm gear drive shaft 32 rotatably mounted within the control box 25. Suitably mounted within the control box 25 is an electric motor 34 connected with the drive shaft 32 by pulleys and a belt 33 for driving the gears. The operation of the motor 34 is controlled by a timing device or time controlled switch diagrammatically illustrated at 35 (Fig. 2). This timing device may be of any well known conventional type or preferred construction and of the type which may be set to start the motor 34 at any predetermined time and stop the motor 34 after it has operated for a predetermined length of time subsequent to each starting thereof.

An electric horn 37 is rigidly connected to the top of the control box 25. The horn 37 may be any one of the many conventional electric horns which are capable of being operated off of a 100° or 115° volt current.

The time device 37 is operatively connected to an electric power supply, not shown, by wires 38. Suitable electric wiring connects the motor 34 and the horn 37 to the timing device 35, whereby the horn 37 will be sounded a predetermined length of time in connection with the operation of the motor 34 for attracting the attention of the livestock to be fed. The preferred embodiment shows the invention as connected to an electric power line, but it is to be understood that where an electric power supply is not available a suitable conventional storage battery, not shown, may be mounted on the top of the control box 25 adjacent the horn 37 for operating the latter and the motor 34 through the time control device 35.

*Operation*

The device is placed in the desired location and connected to a source of electrical power. The hopper 10 is filled with livestock feed, some of which falls downwardly, as shown by the arrows, through the apertures 13 into the housings 20. The feed is restrictively held within the housings 20 by the outlet end 22 being staggered or offset from the apertures 13 and by the auger feed screw 27. The timing device 35 is set to operate at selected times. Thus it seems quite obvious that at the selected time the timing device 35 will actuate the horn 37 for calling the livestock, and start the motor 34 which simultaneously rotates the agitators or paddles 29 and the auger feed screws 27 which discharges feed, as shown by the arrow and dotted lines (Fig. 4), from the housings 20 into the feeding trough 5. Discharge of the feed from the hopper 10 into the trough 5, for a predetermined length of time, is thereby positively effected without any manual effort or attendance, it simply being necessary to replenish the supply of feed within the hopper 10 from time to time as may be found necessary. From the foregoing description, it is believed that the construction and davantages of the present invention will be readily apparent to those skilled in the art.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A livestock feeder, comprising: a rectangular frame; a horizontally disposed trough supported by said frame in spaced parallel relation with the surface of the earth; an elongated V-shaped hopper carried by said frame in spaced parallel relation above said trough, said hopper having a plurality of longitudinally spaced-apart outlet openings in the bottom of said V-shape; a plurality of transverse partitions carried by said hopper, said partitions being arranged in pairs and converging downwardly toward the respective outlet openings in said hopper for forming a series of inverted substantially pyramidoidal sections in said hopper for directing feed materials within the hopper to the outlet openings therein; a U-shaped horizontal discharge housing having the legs thereof longitudinally connected to opposing sides of said hopper adjacent and in communication with each respective outlet opening therein, said discharge housings having one closed end adjacent the respective outlet opening of said hopper, the longitudinal length of each of said housings being greater than the respective outlet openings in said hopper for disposing the open end of each of said discharge housings remote from the respective outlet opening of said hopper; a power driven rotatable auger shaft axially extended through each of said discharge housings; and a flight of auger feed conveyors carried by said auger shaft within each of said discharge housings, each of said flights of auger feed conveyors being substantially equal longitudinally with its respective discharge housing for moving feed from the closed end of said discharge housing and ejecting the same into said trough from the open end of said discharge housings when said auger shaft is rotated.

2. A livestock feeder, comprising: a rectangular upright frame, said frame including four vertically disposed supports; a feed trough rigidly carried horizontally by said supports intermediate the ends thereof; an elongated V-shaped hopper rigidly carried horizontally by the upper end portion of said supports in spaced parallel relation above said feed trough, said hopper having a plurality of longitudinally spaced-apart outlet openings in the bottom of the V-shape; a plurality of transverse partitions carried by said hopper, said partitions being arranged in pairs and converging downwardly toward the respective outlet openings in said hopper for forming a series of inverted substantially pyramidoidal sections in said hopper for directing feed materials within hopper to the outlet openings therein; a U-shaped horizontal discharge housing having the legs thereof longitudinally connected to the opposing sides of said hopper adjacent and in communication with each respective outlet opening therein, said discharge housings having one closed end adjacent the respective outlet opening of said hopper, the longitudinal length of each of said housings being greater than the respective outlet openings in said hopper for disposing the open end of each of said discharge housings in staggered relation with respect to the respective outlet opening of said hopper; a power driven rotatable auger shaft axially extended through each of said discharge housings; a flight of auger feed conveyors carried by said auger shaft within each of said discharge housings, each of said flights of auger feed conveyors being substantially equal longitudinally with its respective discharge housing for moving feed from the closed end of each discharge housing and ejecting the feed into said trough from the open end of each of said discharge housings when said auger shaft is rotated; a rotatable agitator shaft drivably connected at one end to said auger shaft and extended longitudinally through the sections of said hopper in spaced parallel relation with the bottom thereof; and a radially extending agitator paddle rigidly connected to said agitator shaft within each section of said hopper for stirring feed when said auger shaft is rotated.

References Cited in the file of this patent

UNITED STATES PATENTS

| | | |
|---|---|---|
| 1,013,707 | Watson | Jan. 2, 1912 |
| 1,220,958 | Cornwall | Mar. 27, 1917 |
| 1,424,079 | Canell | July 25, 1922 |
| 1,503,335 | Rose | July 29, 1924 |
| 2,522,693 | Stiteler | Sept. 19, 1950 |
| 2,594,687 | Scott | Apr. 29, 1952 |
| 2,631,760 | Hoppes | Mar. 17, 1953 |
| 2,657,831 | Pierce | Nov. 3, 1953 |
| 2,713,442 | McFarling et al. | July 19, 1955 |

FOREIGN PATENTS

| | | |
|---|---|---|
| 419,750 | Italy | Apr. 8, 1947 |